US012675421B2

(12) United States Patent
Chellappan et al.

(10) Patent No.: US 12,675,421 B2
(45) Date of Patent: Jul. 7, 2026

(54) ARTIFICIAL INTELLIGENCE MEMORY ARCHITECTURE SYSTEMS AND METHODS

(71) Applicant: Lattice Semiconductor Corporation, Hillsboro, OR (US)

(72) Inventors: Satheesh Chellappan, El Dorado Hills, CA (US); Raghunandan Chaware, Sunnyvale, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 0 days.

(21) Appl. No.: 18/924,983

(22) Filed: Oct. 23, 2024

(65) Prior Publication Data

US 2026/0111370 A1     Apr. 23, 2026

(51) Int. Cl.
*G06F 13/16* (2006.01)
*G06F 13/28* (2006.01)
*G06F 13/42* (2006.01)

(52) U.S. Cl.
CPC .......... *G06F 13/1668* (2013.01); *G06F 13/28* (2013.01); *G06F 13/4282* (2013.01)

(58) Field of Classification Search
CPC ... G06F 13/1668; G06F 13/28; G06F 13/4282
USPC ........................................................ 711/154
See application file for complete search history.

(56) References Cited

U.S. PATENT DOCUMENTS

| | | | |
|---|---|---|---|
| 5,838,603 | A | 11/1998 | Mori et al. |
| 6,102,963 | A | 8/2000 | Agrawal |
| 6,147,890 | A | 11/2000 | Kawana et al. |
| 7,671,624 | B1 | 3/2010 | Walstrum, Jr. |
| 2003/0212853 | A1 | 11/2003 | Huppenthal et al. |
| 2004/0040005 | A1 | 2/2004 | Carison |
| 2017/0123715 | A1* | 5/2017 | Zhang ................. G06F 13/4068 |
| 2022/0066776 | A1* | 3/2022 | Stevens ............... G06F 9/30036 |
| 2024/0135079 | A1 | 4/2024 | Lin et al. |
| 2024/0231681 | A1* | 7/2024 | Kim ...................... G06F 3/0679 |
| 2024/0281142 | A1* | 8/2024 | Lung ..................... G06F 13/161 |

FOREIGN PATENT DOCUMENTS

CN          111209246 A      5/2020

* cited by examiner

*Primary Examiner* — Jared I Rutz
*Assistant Examiner* — Wei Ma
(74) *Attorney, Agent, or Firm* — Haynes and Boone, LLP

(57) ABSTRACT

A system and method for providing a neural network model to an artificial intelligence (AI) field programmable gate array (FPGA) are provided. A flash memory stores a neural network model. A tunnel is created between a flash memory and a random access memory (RAM) over a multi-line serial peripheral interface (QSPI) interface. Using the tunnel, the RAM reads one or more layers of the neural network model from the flash memory and writes the one or more layers into pages in the RAM. The AI FPGA reads the one or more layers of the neural network model from the RAM over a wide input/output interface and executes the one or more layers.

20 Claims, 7 Drawing Sheets

200

202

204

Flash

218
DMA   P
216
220
CCM CMD
S Decoder

Multi-Channel Router

QSPI
212

206

RAM

S
222   222
222   222

214
Wide IO

QSPI

210

P
RISCV   224
215
CCM
Prefetcher

CNN Engine

AI FPGA
208

200

202

204 Flash

218
DMA    P

216
CCM CMD Decoder

220

S

212

Multi-Channel Router

QSPI

206 RAM

S 222    222

222    222

214
Wide IO

QSPI

210

P

RISCV

215
CCM Prefetcher

224
CNN Engine

AI FPGA

208

300

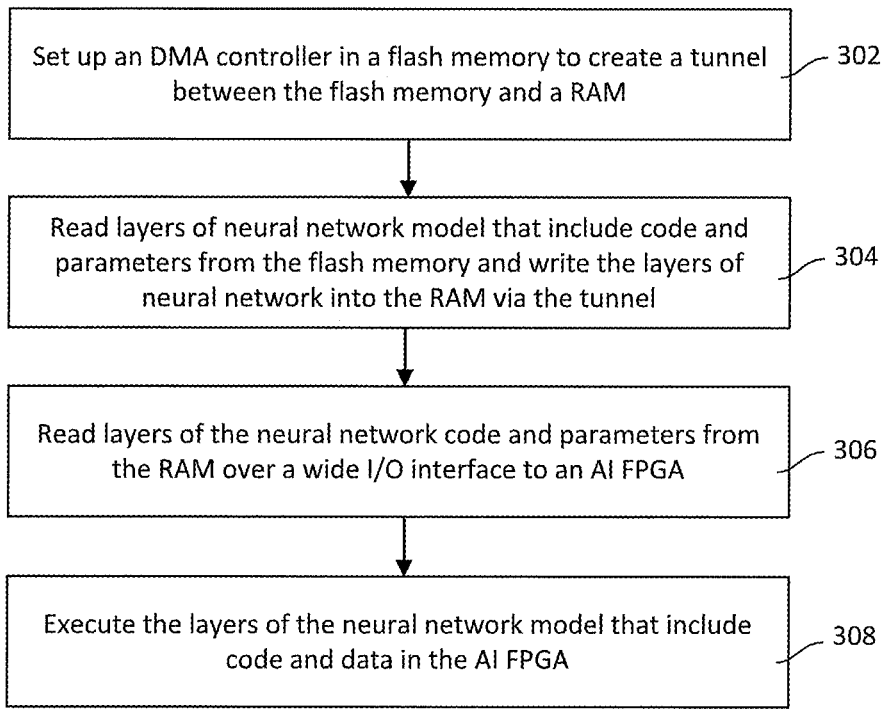

Set up an DMA controller in a flash memory to create a tunnel between the flash memory and a RAM — 302

Read layers of neural network model that include code and parameters from the flash memory and write the layers of neural network into the RAM via the tunnel — 304

Read layers of the neural network code and parameters from the RAM over a wide I/O interface to an AI FPGA — 306

Execute the layers of the neural network model that include code and data in the AI FPGA — 308

FIG. 3

ARTIFICIAL INTELLIGENCE MEMORY ARCHITECTURE SYSTEMS AND METHODS

TECHNICAL FIELD

The disclosure generally relates to an architecture conducive for storing and executing neural network models, and more specifically to an artificial intelligence core coupled memory using multi-chip module packaging technique with field programmable gate array and memory dies.

BACKGROUND

Memory availability and bandwidth are bottlenecks during AI inference tasks. In conventional edge artificial intelligence (AI) applications, the neural network models are stored in a non-volatile flash memory, which has lower bandwidth access to an AI compute engine, such as a compute engine on a field programmable gate array (FPGA). During execution, one or more layers of the neural network model are transferred to the AI compute engine. During this time, the AI compute engine is typically stalled while waiting for memory to fetch the layers of the neural network model parameters that include code and parameters. These stalls create idle cycles, reduce overall compute efficiency, and create power loss.

BRIEF DESCRIPTION OF THE DRAWINGS

FIG. 3 is a flowchart of an exemplary method for storing and executing a neural network model using the memory and PLD architecture, according to some embodiments.

Embodiments of the present disclosure and their advantages are best understood by referring to the detailed description that follows. It should be appreciated that like reference numerals are used to identify like elements illustrated in one or more of the figures.

DETAILED DESCRIPTION

The embodiments are directed to creating a background tunnel between the AI core coupled memory devices, such as a flash memory, e.g., an SPI flash (serial peripheral interface flash) and a RAM (random access memory), such as HyperRAM, DRAM, MRAM, and the like. The flash memory may include a DMA (directed memory access) controller that may be configured by an AI FPGA through descriptor commands. The descriptor commands may be received and/or transmitted over an SPI/QSPI interface. The DMA controller may create a parallel memory interface, such as a DMA channel, for reading data from the flash memory and writing the data to the RAM. The data may include a neural network model and/or the neural network model components, such as individual neural network layers, code, and parameters within the layers. The RAM may provide a write channel access to the flash memory and manage arbitration between the write access and regular memory access from the AI FPGA. In some cases, the AI FPGA may be power gated during this time.

Figure 1:
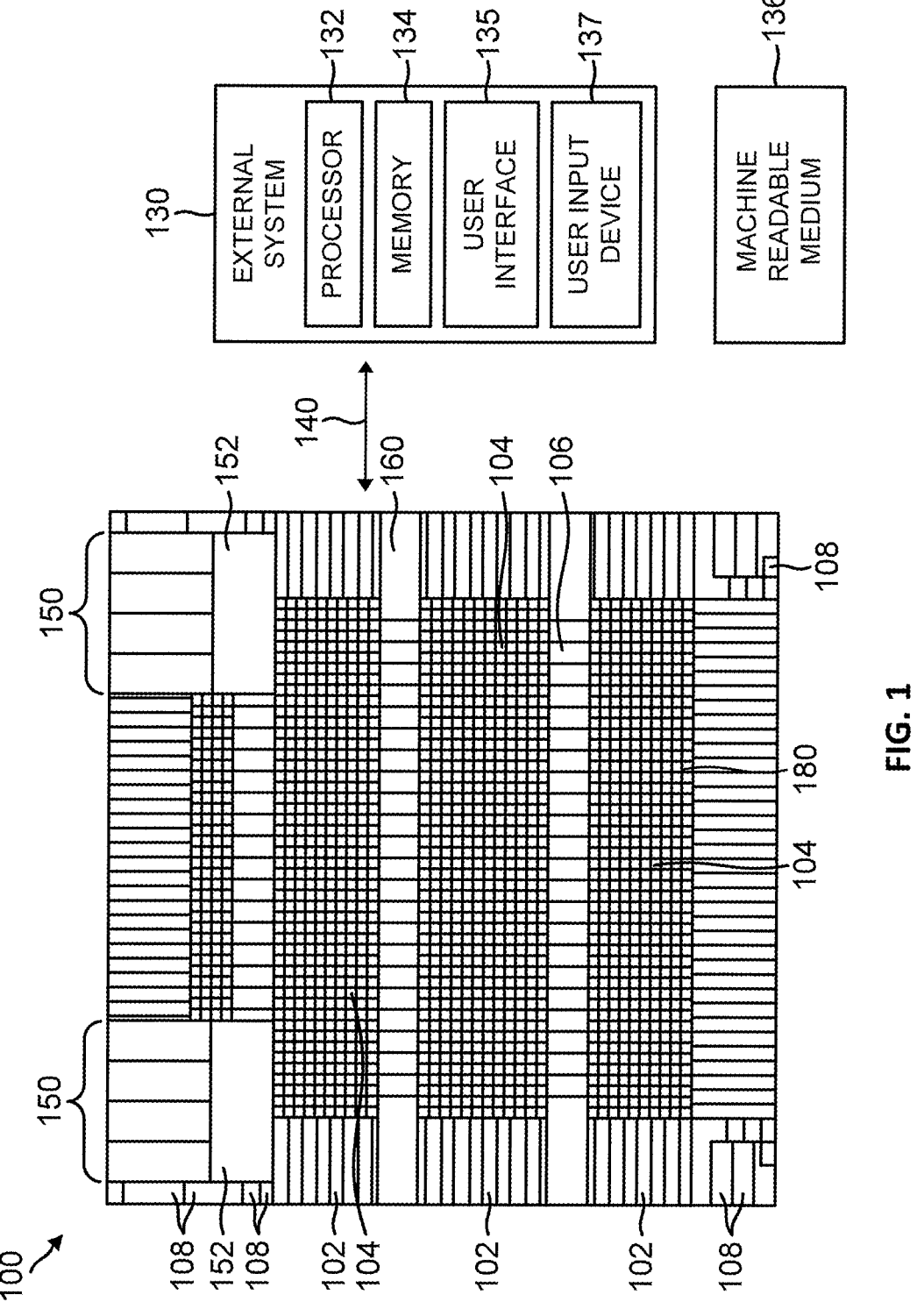
FIG. 1 illustrates a block diagram of a programmable logic device (PLD) in accordance with an embodiment.

FIG. 1 illustrates a block diagram of a programmable logic device (PLD) 100 in accordance with an embodiment of the disclosure. PLD 100 (e.g., a field programmable gate array (FPGA)), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)).

I/O blocks 102 provide I/O functionality (e.g., to support one or more I/O and/or memory interface standards) for PLD 100, while programmable logic blocks 104 provide logic functionality (e.g., LUT-based logic or logic gate array-based logic) for PLD 100. Additional I/O functionality may be provided by serializer/deserializer (SerDes) blocks 150 and physical coding sublayer (PCS) blocks 152. PLD 100 may also include hard intellectual property core (IP) blocks 160 to provide additional functionality (e.g., substantially predetermined functionality provided in hardware which may be configured with less programming than logic blocks 104).

PLD 100 may also include blocks of memory 106 (e.g., blocks of EEPROM, block SRAM, and/or flash memory), clock-related circuitry 108 (e.g., clock sources, PLL circuits, and/or DLL circuits), and/or various routing resources 180 (e.g., interconnect and appropriate switching logic to provide paths for routing signals throughout PLD 100, such as for clock signals, data signals, or others) as appropriate. In general, the various elements of PLD 100 may be used to perform their intended functions for desired applications, as would be understood by one skilled in the art.

For example, certain I/O blocks 102 may be used for programming memory 106 or transferring information (e.g., various types of user data and/or control signals) to/from PLD 100. Other I/O blocks 102 include a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, I/O blocks 102 may be included to receive configuration data and commands (e.g., over one or more connections 140) to configure PLD 100 for its intended use and to support serial or parallel device configuration and information transfer with SerDes blocks 150, PCS blocks 152, hard IP blocks 160, and/or logic blocks 104 as appropriate.

It should be understood that the number and placement of the various elements are not limiting and may depend upon the desired application. For example, various elements may not be required for a desired application or design specification (e.g., for the type of programmable device selected). Furthermore, it should be understood that the elements are illustrated in block form for clarity and that various elements would typically be distributed throughout PLD 100, such as in and between logic blocks 104, hard IP blocks 160, and routing resources 180 to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable and non-programable devices (e.g., application specific integrated circuits (ASICs)), as would be understood by one skilled in the art.

An external system 130 may be used to create a desired user configuration or design of PLD 100 and generate corresponding configuration data to program (e.g., configure) PLD 100. For example, system 130 may provide such configuration data to one or more I/O blocks 102, SerDes blocks 150, and/or other portions of PLD 100. As a result, programmable logic blocks 104, various routing resources, and any other appropriate components of PLD 100 may be configured to operate in accordance with user-specified applications.

In the illustrated embodiment, system 130 is implemented as a computer system. In this regard, system 130 includes, for example, one or more processors 132 which may be configured to execute instructions, such as software instructions, provided in one or more memories 134 and/or stored in non-transitory form in one or more non-transitory machine readable mediums 136 (e.g., which may be internal or external to system 130). For example, in some embodiments, system 130 may run PLD configuration software, such as Lattice Diamond System Planner software available from Lattice Semiconductor Corporation to permit a user to create a desired configuration and generate corresponding configuration data to program PLD 100.

System 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of PLD 100.

PLD 100 may be an artificial intelligence FPGA (AI FPGA) that may be conducive to using code and parameters of a neural network model to process data input. In some instances, to process the data input efficiently, PLD 100 may be communicatively coupled and packaged with a flash memory that may store the neural network model and with a random access memory (RAM) that may read layers of the neural network model from the flash memory either at initialization, boot-up, power-on etc., or in parallel with the AI FPGA executing code and parameters in other layers of the neural network model.

Figure 2:
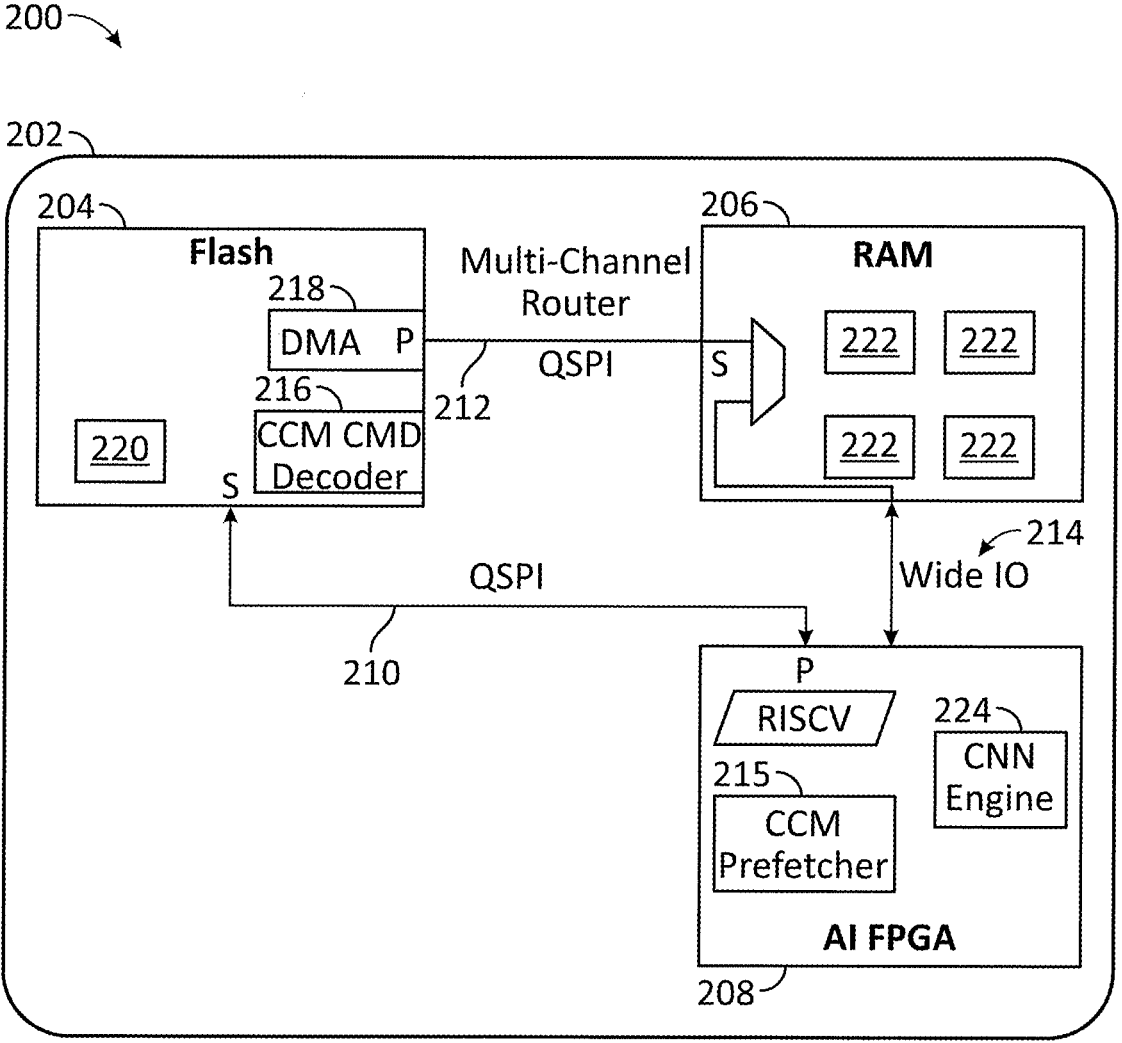
FIG. 2 illustrates a block diagram of an example memory and PLD architecture, according to some embodiments.

FIG. 2 illustrates a block diagram 200 of an example memory and PLD architecture, according to some embodiments. The memory and PLD architecture 202 in FIG. 2 includes a flash memory 204, a RAM 206, and an AI FPGA 208 (which may be the PLD 100). Although not shown, the embodiments may also apply to an AI ASIC instead of, or together with, AI FPGA 208.

Flash memory 204 may be a type of non-volatile storage technology that retains data even when the power is turned off. Some examples of flash memory may be a NOR flash memory, SPI flash memory, NAND flash memory, and the like.

RAM 206 may be a type of volatile memory used in computers and other electronic devices to store data that is actively being used or processed by a compute engine. Unlike flash memory 204 that retains data when the power is off, RAM typically requires power to maintain the stored information. Further, when a computing device is turned off, and hence the power is off, the data stored in RAM 206 is lost. RAM 206 may be a hyper-RAM, DRAM (dynamic RAM), etc. DRAM is high performance, low-power RAM designed for use in embedded systems and Internet of Things (IoT) applications. A hyper-RAM is a variant of a DRAM that offers a balance between speed, power consumption, and cost.

AI FPGA 208 is a field-programmable gate array designed for artificial intelligence (AI) and machine learning (ML) applications. In some instances, AI FPGA 208 may be or include components of PLD 100 discussed above. AI FPGA 208 comprises one or more integrated circuits that are configured by input provided by the customer or designer after manufacturing and consists of an array of programmable logic blocks and a hierarchy of reconfigurable interconnects that may be tailored for specific computational tasks.

In some embodiments, flash memory 204 and AI FPGA 208 may communicate over an interface 210. An example interface 210 may be a multi-line serial peripheral interface (SPI), such as quad SPI (QSPI) interface, octal SPI, and the like. QSPI and octal SPI may be extensions of SPI designed for higher transfer of data by using four data lines instead of one.

Similarly, flash memory 204 and RAM 206 may communicate over an interface 212. Interface 212 may also be a QSPI and may serve as a tunnel to transfer data between flash memory 204 and RAM 206.

RAM 206 and AI FPGA 208 may communicate over an interface 214. Interface 214 may be a wide input/output (I/O) interface, such as a DDR or a HyperBus interface. In some instances, the DDR interface may be used for a small language model (SLM) or optimized large language model applications, while a HyperBus interface may be used for a low power edge application. Interface 214 may be used to fetch data from RAM 206 for execution on AI FPGA 208.

AI FPGA 208 may configure flash memory 204 with a DMA controller 218. DMA controller 218 of flash memory 204 may facilitate data transfer from flash memory 204 to RAM 206 without involving a compute engine of AI FPGA 208. For example, AI FPGA 208 may include a CCM prefetcher 215 that may transmit a closed coupled memory (CCM) command to flash memory 204 via interface 210. The CCM command may be in a reduced instruction set computer language, such as RISC-V. The CCM command may be interpreted by a CCM CMD decoder 216 of flash memory 204 to cause DMA controller 218 to create a pre-fetch DMA path between flash memory 204 and RAM 206 over interface 212. The DMA path would be conducive for reading data from flash memory 204 and writing data to RAM 206.

Flash memory 204 may store a neural network model 220. Neural network model 220 may include multiple layers, with parameters and code within each layer. In some instances, neural network model 220 may be 5 MB or larger and may have millions or billions of parameters. Example neural network model 220 may be a large langue model, a bidirectional encoder representation from transformers (BERT) model, or another large neural network model. Example layers may be a convolutional neural network layer, normalization layer, pooling layer, and the like. Additionally, each layer of neural network model 220 may comprise of one or more sub-layers, each designed to perform a data transformation on input that passes through neural network model 220.

Layers of neural network model 220 may be written to RAM 206 via the DMA path over interface 212. In some instances, neural network model 220 may be written for read access.

RAM 206 may also include multiple pages 222. Layers of neural network model 220 may be written into pages 222. The layers may be written one at a time or as groups. In some instances, an entire neural network model 220 may be loaded into RAM 206 as well, as long as the size of neural network model 220 may fit into RAM 206.

In some instances, AI FPGA 208 may sleep and not process data when the layers of neural network model 220 are being written into RAM 206 from flash memory 204. This may occur during initialization, power-on, pre-boot or boot of a computing device. In other instances, AI FPGA 208 may read the layers of neural network model 220 from some pages 222 using interface 214, as other layers of neural network model 220 are written into other pages 222 over interface 212. Notably, neural network model 220 may be loaded from flash memory 204 into RAM 206 multiple times because RAM 206 is not a persistent memory and typically does not save the state or data once a computer device is turned off.

In some instances, AI FPGA 208 may be power gated as neural network model 220 is written to RAM 206.

In some instances, RAM 206 may manage arbitration between writing data to pages 222 and regular memory access from AI FPGA 208.

In some instances, RAM may retain memory and enter a deep sleep state to save power. Magnetoresistive RAM (MRAM) may be one example of such RAM.

AI FPGA 208 may include a compute engine 224. Compute engine 224 may read pages 222 from RAM 206, including pages 222 that store layers of neural network model 220 over interface 214. As discussed above, interface 214 is a wide input/output interface. Once read, compute engine 224 may execute the layers of neural network model 220. In some instances, AI FPGA 208 may read data, e.g., layers of neural network model 220 pages 222 from RAM 206 as flash memory 204 is writing the layers of neural network model 220 into pages 222 of RAM 206.

The embodiments above illustrate an improvement over conventional techniques where neural network model 220 is not pre-loaded into RAM 206. The improvement lies in RAM 206 acting as a local cache memory for AI FPGA 208 which reduces or eliminates the time it takes to fetch layers of neural network model 220 from flash memory 204 during which a conventional compute engine may stall. The improvement also lies in pre-loading one or more layers of the neural network model 220 during initialization, power-up, and/or boot-time, from flash memory 204 into RAM 206, such that AI FPGA 208 is able to fetch the layers of neural network model 220 from pages 222 in RAM 206 without incurring additional fetch time. As a result, fetching data from flash memory 204 is no longer a bottleneck for AI FPGA 208.

Although the embodiments discussed above refer to reading, writing, and executing neural network model 220, the embodiments are also applicable to reading, writing, and executing, other types of structures, including data, layers, and parameters of those data structures.

FIG. 3 is a flowchart of an exemplary method 300 for storing and executing a neural network model using a flash memory, a RAM memory, and an AI FPGA, according to some embodiments. Notably, method 300 is exemplary and other methods may also be used. The operations 302-306 in method 300 may be implemented using the hardware circuitry discussed in FIGS. 1-2. Note that one or more of the operations may be deleted, combined, or performed in a different order as appropriate.

At operation 302, a DMA controller is set up in flash memory. For example, AI FPGA 208 may issue a CCM command over interface 210 which may set up DMA controller 218 in flash memory 204. As discussed above, interface 210 may be an SPI interface. In some instances, AI FPGA 208 may issue a CCM command during initialization time, boot-up, power-up, etc. The DMA controller 218 may create a tunnel between flash memory 204 and RAM 206 to read and write data.

At operation 304, layers of neural network model that include code and parameters are read from the flash memory and written into the RAM via the tunnel. For example, DMA controller 218 may cause layers of neural network that include code and parameters to be read from flash memory 204 and written into RAM 206 by creating a tunnel via interface 212. Typically, each layer may be stored in one or more pages 222 of RAM 206. During operation 304, AI FPGA 208 may sleep or may read data from other pages 222 in RAM 206 (e.g., pages 222 into which parameters and code are not being written to from flash memory 204).

At operation 306, the neural network code and/or data are read over a wide I/O interface from RAM to AI FPGA. For example, AI FPGA 208 may read layers that include parameters and code of neural network model 220 over interface 214, which may be a wide I/O interface. In some instances, parameters and code of neural network model 220 may be read from one or more pages 222 in RAM 206.

At operation 308, layers of neural network that include code and/or parameters are executed. For example, compute engine 224 of AI FPGA 208 may execute the code and parameters of neural network model 220 to process data input, such as input from a camera, data sets, and the like.

Figure 4A:
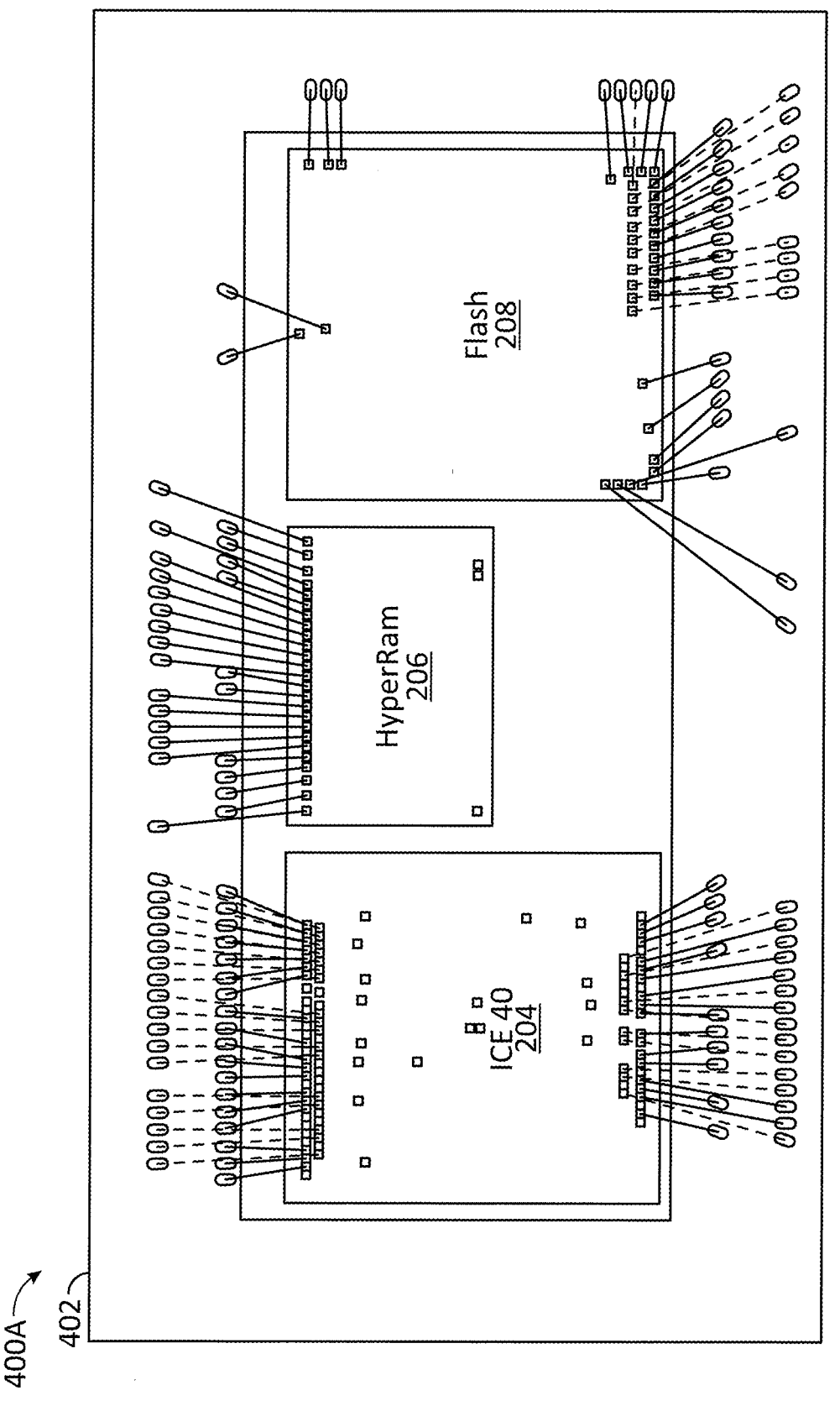
FIGS. 4A-4B illustrate diagrams of a layout of a multi-chip module package on a chip that includes the memory and PLD architecture, according to some embodiments.
Figure 4B:
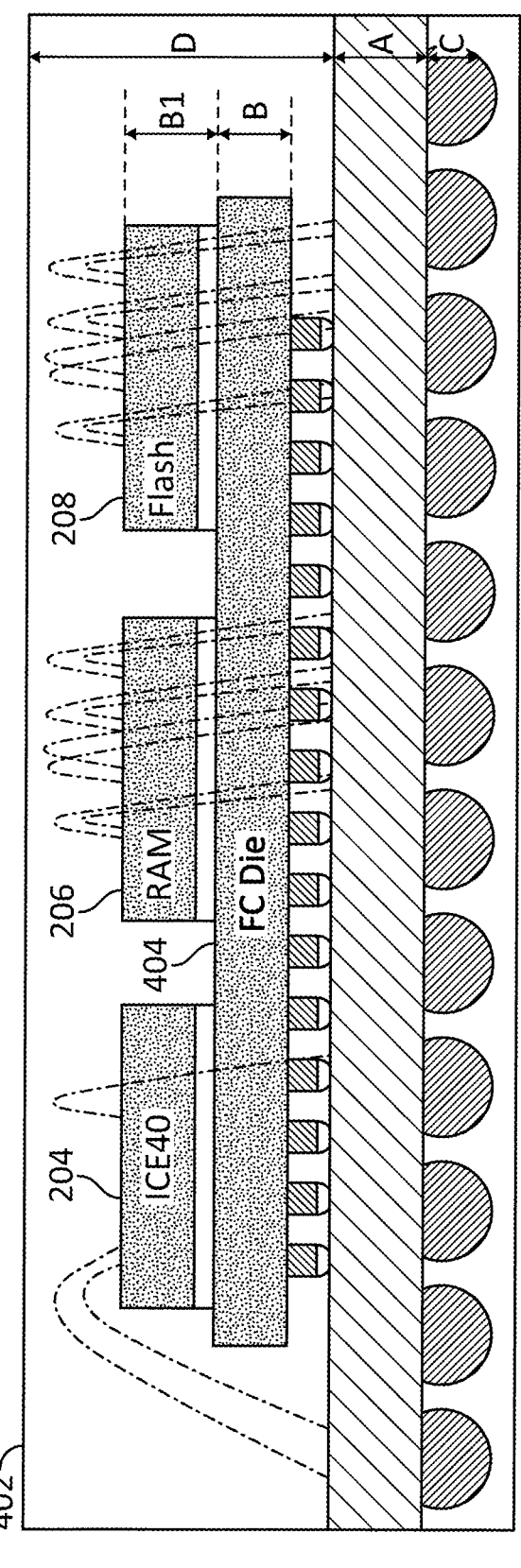

FIGS. 4A-B are diagrams 400A-B of a multi-chip module package on a chip, according to some embodiments. FIGS. 4A-B illustrate a multi-chip module (MCP) package on a chip (POC) (also referred to as MCP POC 402) that includes flash memory 204, RAM 206, and AI FPGA 208, according to some embodiments. Notably, flash memory 204 is next to RAM 206 (e.g., within 308.75 mm), and RAM 206 is next to AI FPGA 208 (e.g., within 308.75 mm) to increase speed of data transmission using interfaces 212 and 214 (not shown). Also, as illustrated in FIG. 4B, flash memory 204, RAM 206, and AI FPGA 208 are on top of die 404 which facilitates the speed of transmission between flash memory 204 and RAM 206 via interface 212, and between RAM 206 and AI FPGA 208 via interface 214. In some instances, flash memory 204, RAM 206, and AI FPGA 208 may communicate using direct die-to-die bonding interface (not shown) or interposers (not shown) which may further increase bandwidth via parallel connectivity. Interposers may be electrical signal conduits may connect components of the multi-chip module package on a chip, and may be made from Silicon or another organic material.

Figure 5:
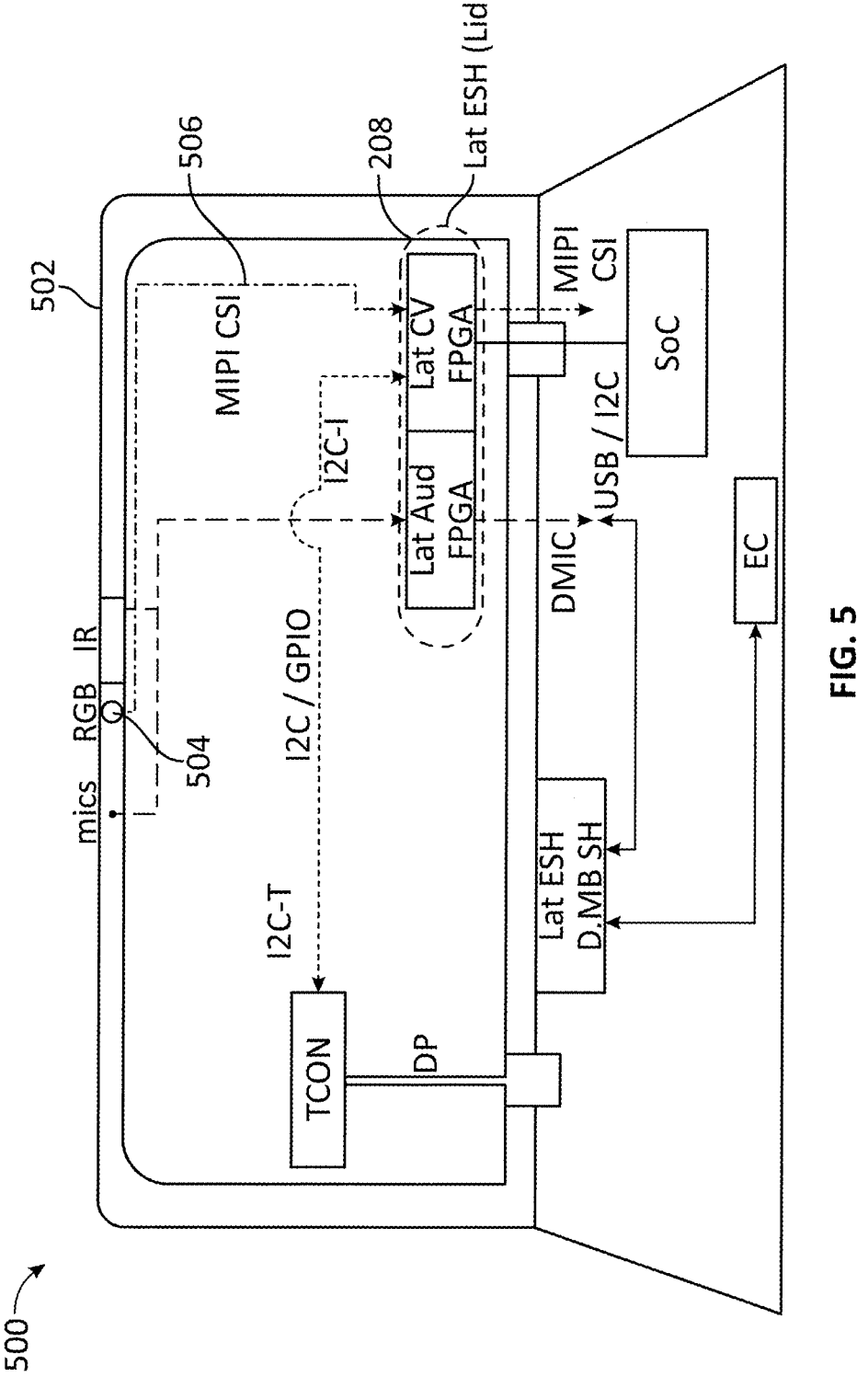
FIG. 5 illustrates a diagram of a computing device that includes the multi-chip module package on a chip, according to some embodiments.

FIG. 5 is a diagram 500 illustrating a computing device with an AI FPGA, according to an embodiment. FIG. 5 illustrates a computing device 502, which may be a laptop, a smartphone, a tablet, a desktop, and the like. Although only AI FPGA 208 is shown in computing device 502, computing device 502 also incorporates MCP POC 402 discussed in FIGS. 4A-B. In some embodiments, AI FPGA 208 may receive input from various input devices in computing device 502. FIG. 5, for example, illustrates an embodiment where AI FPGA 208 receives input from a camera 504 via interface 506, which may be a MIPI CSI. The input, for example, may be an image, for which AI FPGA 208 may use a neural network model loaded into RAM 206 and fetched by AI FPGA 208 (as discussed in FIG. 2) to determine the objects displayed in the image.

Figures 6A, 6B, 6C:
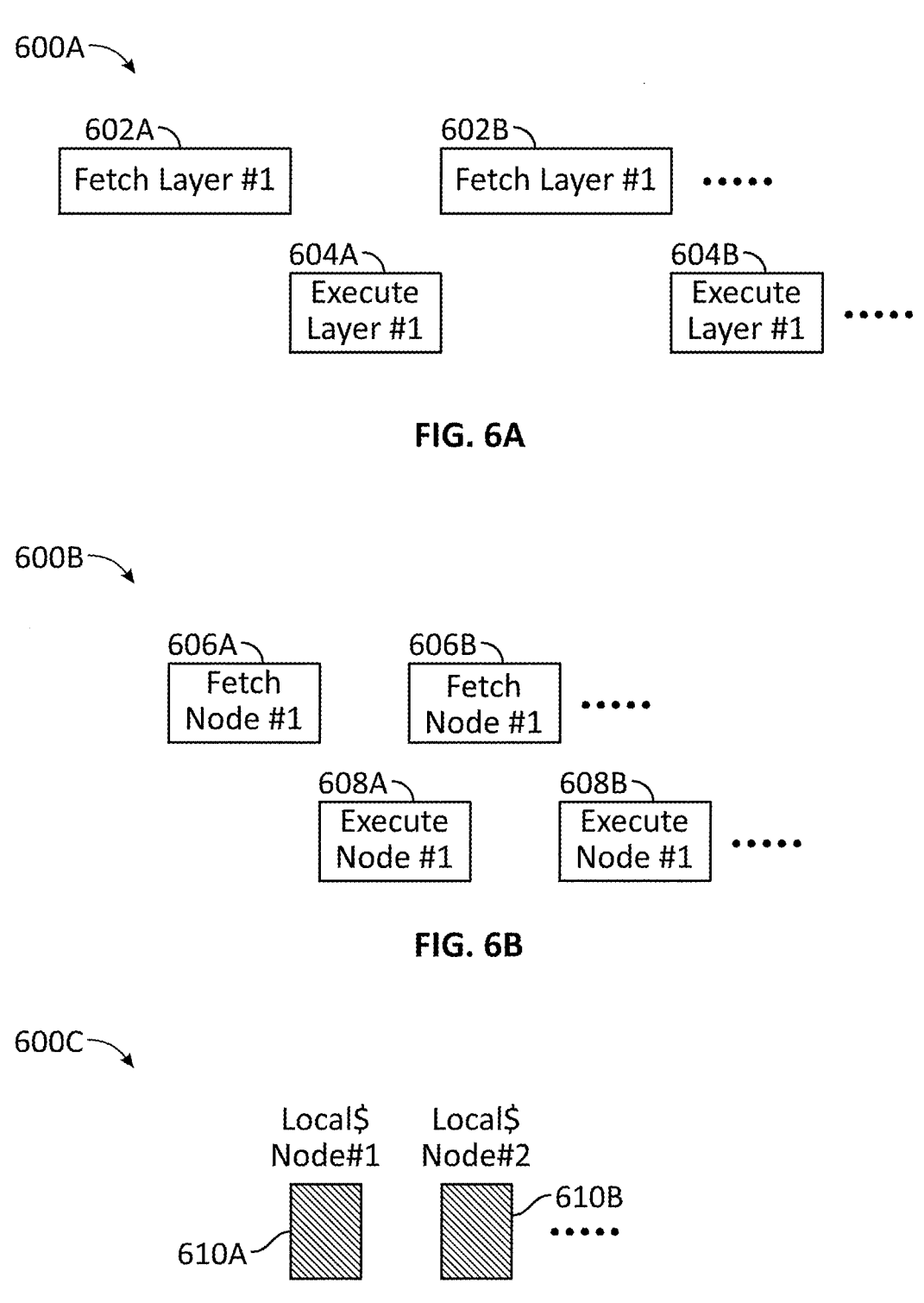
FIGS. 6A-6B are diagrams that illustrate timing of conventional embodiments for fetching and executing a neural network model, according to some embodiments.
FIG. 6C is a diagram that illustrates timing of the example memory and PLD architecture for fetching and executing a neural network model, according to some embodiments.

FIGS. 6A-B are timing diagrams 600A-B of conventional designs, and FIG. 6C is a timing diagram of a MCP POC 402, according to some embodiments. FIGS. 6A-C illustrate an improvement of MCP POC 402 over conventional designs, according to some embodiments. FIG. 6A illustrates a conventional embodiment where each layer of a neural network model is read directly from flash memory and then executed. The layers are read serially, where a conventional AI FPGA performs a fetch 602A that retrieves a portion of the first layer of a neural network model and then performs execution 604A that executes a retrieved portion of the first layer. The conventional AI FPGA then performs a fetch 602B that retrieves another portion of the first layer, and then performs an execution 604B of that portion of the first layer. Notably, the process described in FIG. 6A is highly serialized, such that the compute engine of the AI FPGA is dormant and does not process data during fetches 602A and 602B. Further, although the AI FPGA may have local memory within the AI FPGA, the local memory is insufficient to store a layer of the neural network model, which causes the AI FPGA to retrieve the layer from a flash memory (not shown) using serialized fetches, such as fetches 602A and 602B.

FIG. 6B illustrates a conventional embodiment where neural network layers may be fetched at a node and/or instruction level as fetches 606A and 606B. The AI FPGA may then perform an execution 608A of the first node once fetch 606A completes, and execution 608B of the second node once fetch 606B completes. Unlike the implementation in FIG. 6A, the embodiment in FIG. 6B is not serialized because fetch 606B of the second node may be performed in parallel with execution 608A of the first node.

FIG. 6C illustrates the embodiment discussed in FIGS. 1-5. As discussed above, RAM 206 acts as a local cache memory for AI FPGA 208 with no added fetch time, as layers in pages 222 may be fetched over the wide I/O interface 214. As a result, fetching the layers of neural network model 220 from flash memory 204 is no longer a bottleneck because the layers are pre-written into RAM 206. In FIG. 6C, the efficiency of executing neural network model 220 depends on the Silicon device capacity.

Where applicable, various embodiments provided by the present disclosure can be implemented using hardware, software, firmware, or combinations of hardware, software and firmware. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as program code and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:

1. A system comprising:
a flash memory configured to store a neural network model and comprising a direct memory access (DMA) controller configured to create a tunnel over a first interface;
a random access memory (RAM) configured to read, over the first interface, one or more layers of the neural network model from the flash memory and write the one or more layers of the neural network model into the RAM; and
an artificial intelligence (AI) field programmable gate array (FPGA) and/or Application Specific Integrated Circuit (ASIC) configured to read the one or more layers of the neural network model from the RAM over a second interface and execute the one or more layers.

2. The system of claim 1, wherein the AI FPGA is further configured to issue a closed coupled memory (CCM) command to the flash memory over a third interface, wherein the CCM command initiates the DMA controller at the flash memory.

3. The system of claim 2, wherein the third interface is a multi-line serial peripheral interface (QSPI) interface.

4. The system of claim 1, wherein the first interface is a multi-line SPI interface.

5. The system of claim 1, wherein the one or more layers of the neural network model are written into a plurality of pages in the RAM.

6. The system of claim 5, wherein the AI FPGA is further configured to read a first layer of the neural network model stored in a first page from the plurality of pages over the second interface while the RAM is configured to write a second layer into a second page in the plurality of pages from the flash memory.

7. The system of claim 1, wherein the second interface is a wide input/output interface.

8. The system of claim 1, wherein the RAM is further configured to read and write the one or more layers of the neural network model over the first interface during boot-up of a computing device.

9. The system of claim 1, wherein the flash memory is next to the RAM and the RAM is next to the AI FPGA on a multi-chip module package on a chip.

10. The system of claim 1, wherein the flash memory further comprises a closed coupled memory (CCM) command decoder configured to interpret a CCM command from the AI FPGA, and wherein the DMA controller creates the tunnel in response to the CCM command.

11. The system of claim 1, wherein the DMA controller is configured to transfer the one or more layers of the neural network model from the flash memory to the RAM without involving a compute engine of the AI FPGA.

12. A method comprising:
creating, using a direct memory access (DMA) controller in a flash memory, a tunnel over a first interface between the flash memory and a random access memory (RAM);

reading, using the tunnel over the first interface, from a flash memory, one or more layers of a neural network model;

writing, using the tunnel over the first interface, the one or more layers of the neural network model into the RAM;

reading, over a second interface, into an artificial intelligence (AI) field programmable gate array (FPGA) and/or Application Specific Integrated Circuit (ASIC) the one or more layers of the neural network model from the RAM; and executing, using a compute engine of the AI FPGA, the one or more layers of the neural network model.

13. The method of claim 12, further comprising:

issuing, over a third interface, from the AI FPGA a closed coupled memory (CCM) command to the flash memory; and initiating, using the CCM command, a direct memory access (DMA) controller at the flash memory.

14. The method of claim 13, wherein the first interface and/or the third interface is a multi-line SPI interface or a direct die-to-die interface.

15. The method of claim 12, wherein the one or more layers of the neural network model are written into a plurality of pages in the RAM.

16. The method of claim 15, further comprising:

reading, by the AI FPGA and over the second interface, a first layer of the neural network model stored in a first page from the plurality of pages while writing, by the RAM, a second layer into a second page in the plurality of pages from the flash memory.

17. The method of claim 12, wherein the second interface is a wide input/output interface or a direct die-to-die interface.

18. The method of claim 12, wherein the reading and the writing the one or more layers of the neural network model into the RAM occurs during initialization of a computing device.

19. The method of claim 12, wherein the flash memory is next to the RAM and the RAM is next to the AI FPGA on a multi-chip module package on a chip.

20. A system comprising:

a flash memory configured to store a data structure and comprising a direct memory access (DMA) controller configured to create a tunnel over a first interface;

a random access memory (RAM) configured to load, using the tunnel over the first interface, a portion of the data structure from the flash memory into the RAM; and an artificial intelligence (AI) field programmable gate array (FPGA) and/or Application Specific Integrated Circuit (ASIC) configured to read the portion of the data structure from the RAM over a second interface and execute the portion of the data structure.

* * * * *